United States Patent
Loucks et al.

(10) Patent No.: US 9,563,217 B2
(45) Date of Patent: Feb. 7, 2017

(54) METHOD AND APPARATUS TO OPTIMIZE GENERATOR START DELAY AND RUNTIME FOLLOWING OUTAGE

(71) Applicant: Eaton Corporation, Cleveland, OH (US)

(72) Inventors: David G. Loucks, Coraopolis, PA (US); Todd M. Lathrop, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 501 days.

(21) Appl. No.: 14/108,490

(22) Filed: Dec. 17, 2013

(65) Prior Publication Data

US 2015/0168975 A1 Jun. 18, 2015

(51) Int. Cl.
| | |
|---|---|
| *G05F 1/66* | (2006.01) |
| *G05B 15/02* | (2006.01) |
| *H02J 9/06* | (2006.01) |
| *H02J 3/00* | (2006.01) |

(52) U.S. Cl.
CPC ............... *G05F 1/66* (2013.01); *G05B 15/02* (2013.01); *H02J 9/061* (2013.01); *H02J 2003/003* (2013.01); *Y04S 10/54* (2013.01)

(58) Field of Classification Search
CPC ........ G05F 1/66; H02J 9/061; H02J 2003/003; G05B 15/02; Y04S 10/54
See application file for complete search history.

(56) References Cited

U.S. PATENT DOCUMENTS

| | | | |
|---|---|---|---|
| 5,775,107 A * | 7/1998 | Sparkman | F03G 6/02 60/641.1 |
| 6,459,175 B1 * | 10/2002 | Potega | B60L 11/185 307/132 M |
| 7,566,990 B2 | 7/2009 | Loucks et al. | |
| 7,569,949 B2 | 8/2009 | Lathrop et al. | |
| 7,615,888 B2 | 11/2009 | Lathrop et al. | |
| 7,635,967 B2 | 12/2009 | Loucks et al. | |
| 7,723,863 B2 | 5/2010 | Johnson, Jr. et al. | |
| 7,948,117 B2 | 5/2011 | Lathrop et al. | |
| 2005/0125083 A1 * | 6/2005 | Kiko | G05B 15/02 700/19 |
| 2008/0179967 A1 | 7/2008 | Lathrop et al. | |
| 2008/0272934 A1 * | 11/2008 | Wang | H02J 3/14 340/870.11 |
| 2010/0019574 A1 * | 1/2010 | Baldassarre | H02J 3/14 307/23 |
| 2011/0051325 A1 * | 3/2011 | Kawasaki | H02J 3/06 361/631 |

(Continued)

FOREIGN PATENT DOCUMENTS

| | | |
|---|---|---|
| DE | 10226755 A1 | 2/2004 |
| JP | 2010019574 | 1/2010 |

OTHER PUBLICATIONS

International Search Report dated Jan. 26, 2015 from related matter PCT/IB14/065513.

*Primary Examiner* — Ramesh Patel
(74) *Attorney, Agent, or Firm* — Fishman Stewart PLLC (57) ABSTRACT

A system for providing backup power to a facility includes a generator, and a controller configured to determine whether electrical power to the facility has been interrupted, and automatically determine a generator initial start and restart time delay based at least on a prediction of when an electrical system within the facility needs to be cycled.

20 Claims, 6 Drawing Sheets

(56) References Cited

U.S. PATENT DOCUMENTS

| | | | | |
|---|---|---|---|---|
| 2011/0121654 A1* | 5/2011 | Recker | ............... | H05B 37/0272 |
| | | | | 307/66 |
| 2012/0068541 A1* | 3/2012 | Anderson | ............... | H02J 9/061 |
| | | | | 307/66 |
| 2012/0092811 A1* | 4/2012 | Chapel | ................... | H04L 12/10 |
| | | | | 361/622 |
| 2013/0049476 A1* | 2/2013 | Lathrop | ................... | H02J 3/06 |
| | | | | 307/80 |
| 2013/0345888 A1* | 12/2013 | Forbes, Jr. | ................ | H02J 3/14 |
| | | | | 700/291 |
| 2014/0084687 A1* | 3/2014 | Dent | ....................... | H02M 1/32 |
| | | | | 307/26 |

* cited by examiner

METHOD AND APPARATUS TO OPTIMIZE GENERATOR START DELAY AND RUNTIME FOLLOWING OUTAGE

CROSS-REFERENCE TO RELATED APPLICATIONS

Concurrently filed herewith is patent application Ser. No. 14/108,546 Active Engine Cool Down Time Delay for Automatic Transfer Switch Controllers, and patent application Ser. No. 14/108,465 Method and Apparatus to Change Generator Start Delay and Runtime Following Outage, the disclosures of which are incorporated herein in their entirety.

BACKGROUND

The disclosure relates generally to power systems and methods that employ generators for backup power to a facility, and more particularly, to a system, method, and controller for optimizing a generator start delay and runtime following an outage.

Typically, electrical power is provided from a primary source (such as a utility or a "grid") to facilities that include residential, small business, and industrial environments. However, occasionally the electrical power is interrupted for reasons that may include weather damage to power lines and equipment, power plant shutdowns (scheduled or not), and other sorts of system failures such as cascading plant failures. Although the grid can be generally stable over time and may operate uninterrupted for months or more, the possibility of lost power from the primary source is nevertheless ever-present and can result in a range of hardships that extend from a inconvenience, to lost business, to life-threatening situations.

For instance, in a residential application, not only are the occupants inconvenienced, but if sump pumps, refrigerators, furnaces, and air conditioning units are not powered, this can lead to flooding in the basement, food spoilage, high temperatures within the residence during summer (e.g., stagnant hot temperatures), or dangerously low temperatures during the winter (e.g., for certain medical conditions, threat of burst water lines, risk of frostbite). A business as well, such as a restaurant, may experience food spoilage and customer dissatisfaction in the event of a power outage. In an industrial setting, if power is lost, a plant shutdown may occur that can lead to lost production and employee/equipment downtime, and some industrial facilities have a critical requirement for continuous power (such as certain plant processes, computer installations, and the like), such as a wastewater treatment plant in which a power loss can lead to overflowing tanks and untreated sewage discharge. Also, some facilities such as urgent care providers and hospitals rely on uninterrupted power to power life-supporting equipment. In many instances there is a legal requirement to provide uninterrupted, or minimally interrupted, power to the facility to avoid the repercussions that can occur if primary power is lost.

As such, backup electrical generators are often provided that serve as a standby or secondary source in the event of primary power outage. The backup generator may be manually connected to loads within the facility when primary power is lost. Or, in many instances a backup system includes an automatic transfer switch (ATS) that detects power from the primary source, and when primary power is lost, the ATS controllably disconnects the primary source, powers up the standby generator, and engages the generator power with the loads. The ATS can work in reverse as well, so that when primary power is again online the ATS switches back to the primary and powers down the standby generator.

ATS' often have built-in time delays that are implemented during operation to ensure the least amount of interruption to the end user. In one example, there may be a time delay to prevent automatic re-closures from occurring before the ATS starts the generator, which protects against un-needed engine starts. Another example of a time delay is the time delay before transferring to the generator once the generator is running, which allows for proper engine warm-up before applying a load to it. And, another time delay is the time that the generator runs after it has been determined to shut down the generator and after the generator load has been removed (that is, to run in an unloaded state and cool the generator). ATS' typically have timers that are either hard coded and cannot be changed, dip switches that allow minimal choices in the time delay, or the time delay may be programmed in advance.

When an outage occurs in, for instance, a residence or a small business such as a restaurant, a controller or the ATS is typically programmed to start and connect the generator within a short period of time after the outage occurs. After starting the generator, it runs essentially 100% of the time. As such, the numerous types of loads within the facility (e.g., refrigerator, air conditioner, freezer, furnace, computer, stove, oven, entertainment systems, etc.) are kept powered and occupants of the facility experience minimal downtime and inconvenience.

However, because of the automated system operation of the ATS, generator backup is provided also for times when an outage occurs and the facility is unoccupied. For instance, if the facility is a residence and the occupants are on vacation, then the load requirements are not as stringent as compared to when occupied. Similarly, if the facility is a small business such as an office complex or a restaurant (typically unoccupied late evening or early morning), there may be less stringent requirements for running the loads therein.

For instance, according to the USDA, with doors kept closed, refrigerators can maintain a safe temperature for 4 hours, while freezers can maintain proper temperatures for up 24 hours or more (depending on how full the freezer is). As another example, an unoccupied building may only need to be kept above freezing in winter, or below a certain temperature in summer (such as for plants within the residence), and not to the comfort level kept typically while occupied.

Thus, it may not be necessary to continually run the generator and power the loads within the facility if it is unoccupied. As one example, by continually running the refrigerator and having it cycle on and off based on its normal operating parameters. And, in another example, by continually running the air conditioner (or furnace) and having it cycle on and off based on its normal operating parameters, the generator may thereby be running excessively.

Therefore, when a facility is unoccupied, it is desirable to control the loads within the facility in a different fashion than when it is occupied.

BRIEF DESCRIPTION

Examples of the disclosure are directed to a method and apparatus for controlling loads within a facility based on whether the facility is occupied.

A system for providing backup power to a facility includes a generator, and a controller configured to determine whether electrical power to the facility has been interrupted, and automatically determine a generator restart time delay based at least on a prediction of when an electrical system within the facility needs to be cycled.

A method for providing backup power to a facility includes determining whether electrical power to the facility has been interrupted, and automatically determining a generator restart time delay based at least on a prediction of when an electrical system within the facility needs to be cycled.

A computer-readable medium (also referred to as a processor-readable medium) includes any non-transitory (e.g., tangible) medium that participates in providing data (e.g., instructions) that may be read by a computing device (e.g., by a processor of a computer). Such a computer-readable medium may tangibly embody computer-executable instructions to determine whether electrical power to a facility has been interrupted, and automatically determine a generator restart time delay based at least on a prediction of when an electrical system within the facility needs to be cycled.

Various other aspects, features, and advantages of the present disclosure will be made apparent from the following detailed description and drawings.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

The present disclosure is directed toward a method and apparatus for controlling loads within a facility based on whether the facility is occupied. If occupied, then it may be desirable to run the generator continuously, or frequently enough to ensure that proper temperatures and system operations within a building are operated to support equipment use, provide temperature control (environmental, within refrigerators and freezers, etc.), to maintain proper comfort of the occupants. If not occupied, however, then larger temperature swings may be tolerated to minimize or reduce the amount of cycling that a generator experiences, to reduce the number of starts and stops, and to reduce overall runtime. In another example, if occupied but the occupants are inactive or asleep, power may not be provided as readily since perhaps only building temperatures need to be maintained.

Figure 1:
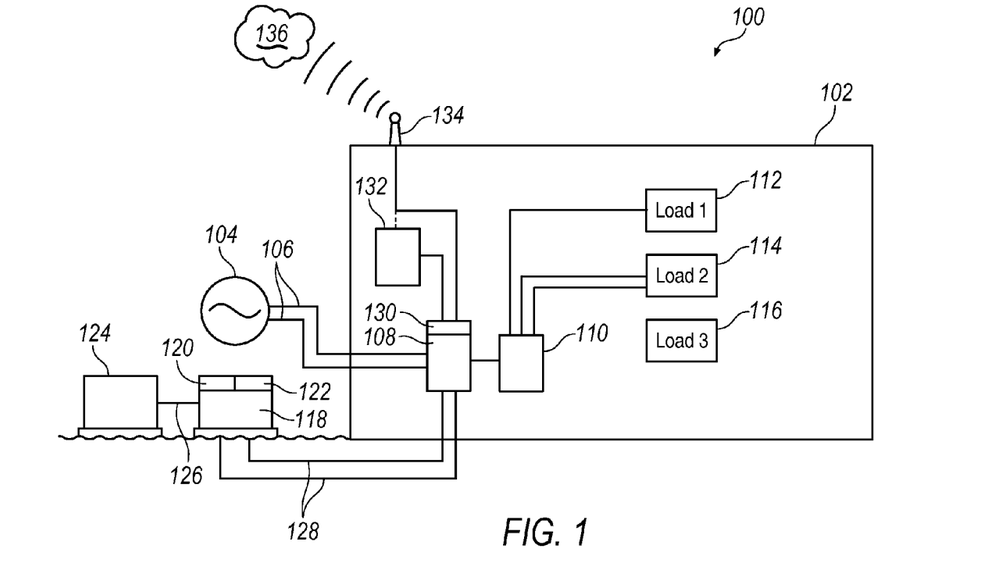
FIG. 1 illustrates a premises that include a building having a generator for backup.

FIG. 1 shows premise 100 that includes a building 102 having electrical power fed thereto from a primary electrical energy source or an electrical source 104, such as an electrical grid, via power lines 106. Electrical power is fed via lines 106 to building 102 and to a transfer switch 108. Transfer switch 108 is electrically coupled to a load center 110, which is electrically coupled to electrical loads 112, 114, and 116. Loads 112-116 may include but are not limited to air conditioning, computers, lighting, refrigeration, life-support systems, and power ports for re-charging electrical devices, as examples.

A standby generator 118 is positioned on premise 100 and proximate building 102. Standby generators are often positioned outside of a building to provide an alternative or backup source of electrical power for facilities that rely on electrical power for preserving life, preserving perishable items, preventing accidents, preventing theft, and providing security, as examples. Often, a standby generator is designed or selected to provide backup power for a specific application, such as a residential, a commercial, or an industrial facility. For a residential application, it is typically desirable to provide backup power for freezers, air conditioning or heating, for lighting, or to recharge mobile devices and run a computer, as examples. Whereas in a commercial or industrial facility, backup power may be provided to keep the facility fully functional and with minimal downtime in the event or a power outage. In some instances it may be a legal requirement to include backup power (such as if a life-support system is being powered by the utility), as opposed to a "business requirement" (such as in a restaurant where it may be desired to keep operating and not inconvenience customers).

Generators may include air-cooled portable, air-cooled stationary, or liquid-cooled stationary units, the type of which is selected often on the size and convenience of use, the type of fuel (which may be based on fuel cost or availability, and may include gasoline, natural gas, liquid propane, diesel, or waste gas from a wastewater treatment plant digester [e.g., biofuel], as examples), or the type of backup power that is being provided for, as examples. A typical generator includes an engine 120 and a control panel 122, as well as an oil filter, fuel control, air intake, exhaust, and the like. According to one example, a fuel storage tank 124 may be situated proximate generator 118, which provides fuel via a fuel line 126.

When a power outage event occurs, standby generator 118 provides backup power to building 102. Before providing the backup power, the electrical components (i.e., loads 112-116) are taken "offline" to isolate the building electrically and prevent back-feeding power from generator 118 onto the utility. Isolation can be done either in a main breaker switch within load center 110, or via transfer switch 108. In one example, loads may be sensed via a current transformer. It is contemplated, however, that the generator in one example is prevented from back-feeding into the utility. In another example, a transfer switch may be used where the sources are paralleled. In this example the generator could backfeed (what is known as exporting power), which may be done in a wastewater treatment plant where the generator runs 24×7 paralleled with the utility and pumping excess generated power into the grid.

As shown, the generator and utility power meet at transfer switch 108 (lines 128 for the generator and lines 106 for the utility), and from there the power is routed to loads 112-116 via load center 110. Thus, it is contemplated that back-feeding to the utility may be prevented by way of an "open transition" design of transfer switch 108. That is, in an open transition design, either the utility or the generator is connected to the loads 112-116, but not both at the same time. It is contemplated, however, that a "closed transition" transfer switch, as well as an "in-phase" transfer switch may also be employed, according to the disclosure. In one illustrative approach a back-feed breaker is included in lieu of a transfer switch; it is contemplated, however, that other known solutions, typically mechanical in nature, interlock a main breaker and the back-feed breaker to ensure that the utility is not back fed to the generator. After isolation, generator 118 is run, and power is provided to building 102, and to loads such as loads 112-116.

In one example, generator 118 may have an air-cooled portable generator that is stored elsewhere when not in use. When a power outage occurs, an operator manually disconnects the main electrical power from the utility and connects the generator directly to electrical loads via extension cords (if no transfer switch 108 is present in the building). However, such operation can be inconvenient and time-consuming, and may require someone to physically move the generator, isolate from the utility, and connect to the loads. Such inconvenience may be reduced by providing transfer switch 108, which provides a convenient connection location for the generator to be interconnected to loads 112-116. However, in this example, transfer switch 108 is a manual transfer switch and also may require someone to physically move the generator and isolate from the utility. Such operation may also be semi-automatic in which one or more of the steps (operating the transfer switch, powering up the generator, etc. . . . ) are done manually but with the convenience of a pushbutton).

In another example generator 118 is a stationary unit (air or water cooled) that is permanently positioned next to building 102 and wired directly thereto, avoiding the need to connect to building 102 when an outage occurs. Such a system typically includes transfer switch 108 which may be a manual switch, but is more likely to be an automatic transfer switch (ATS) for providing automatic control of a variety of backup power system operations. In this example, power is conveyed from stationary generator 118 via power lines 128, which in one illustrative example are installed underground and semi-permanently. In one example, ATS 108 includes a programmable module 130 that allows input of control parameters, operational parameters, and the like. However, in another example (or in addition to module 130), a programmable computer system or controller 132 may be provided that is electrically coupled to ATS 108, and through which programmable control may be implemented.

Also, operation of module 130 and/or computer 132 may be via a hand-held device such as a "smart phone" in which and application or "app" may be used to control operation, program parameters, and the like. In one exemplary illustration, the smart phone may be in direct wireless communication with module 130 and/or computer 132, and in another example such control is via an external source 134. External source 134 may be an incoming cable box that provides internet access, may be a satellite hookup, may be a wireless server (Wi-Fi), or may be via "cloud computing" 136, as an example.

When transfer switch 108 is an automatic switch (ATS), and when a power outage occurs, ATS 108 operates to automatically power up generator 118 to provide power via lines 128, isolate the loads 112-116 from the utility (and no power therefore transfers along lines 106 that originates from the utility 104), and connect the loads 112-116 to the generator 118. According to one example, computer 132 detects power lost from electrical source 104, which may be via ATS 108.

Disconnection may be via a contactor, or other known switching devices, designed to perform load transfer between two AC sources, or may be via a molded case or power-case circuit breaker and without a trip unit. In the case of a contactor, an operating mechanism typically includes a solenoid and a mechanical interlock, and when the solenoid is energized it drives the moving contacts to transfer from one source to another (i.e., from the utility to the generator). For a molded case design, a circuit breaker may be provided without an overcurrent trip, and two separate power devices that may transfer by opening the first source and closing the second source (e.g., the utility and the generator representing the first source and the second source).

ATS 108 may be operated via a number of control parameters, that may include but are not limited to, which loads to power and which to bypass, how long to power the loads, how long the generator is run for cool down, and warnings if overheating, low fuel, and the like. ATS 108 may also continue to monitor for power from the utility and thus, when power is detected (i.e., the utility is again providing power), then ATS 108 may automatically return connectivity to the utility by disconnecting load from the generator, re-connecting to the utility, and shutting down the generator after a programmed cool-down delay. Operation of ATS 108 may therefore be controlled via a number of parameters that may be in module 130, computer 132, or remotely controlled or programmed via a wireless devices via, for instance, external source 134.

Figure 2:
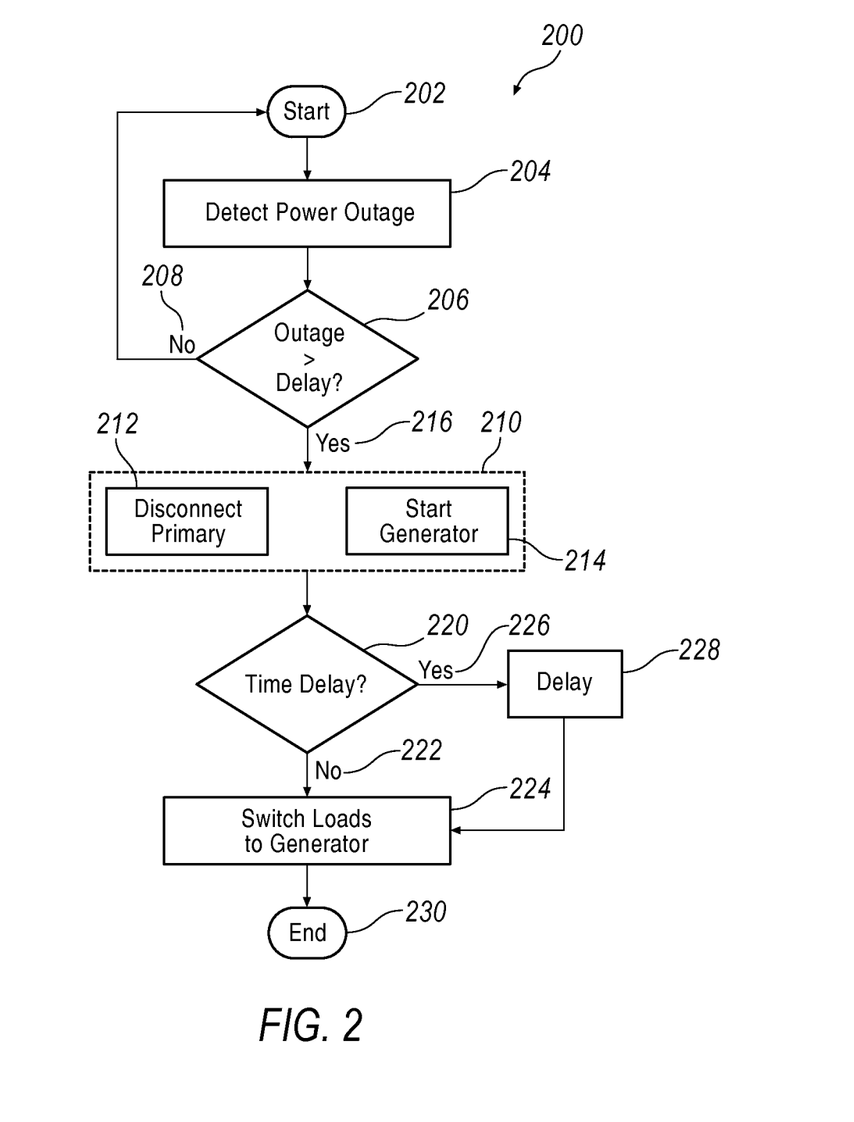
FIG. 2 illustrates a method or process flow that includes steps for bringing a back-up generator online.

FIG. 2 illustrates an illustrative process flow 200 that includes steps for bringing a back-up generator online, according to one example. Flow 200 may be implemented in a controller, such as controller 132 of FIG. 1, or via a programmable module of a transfer switch, such as module 130 of switch 108, as examples. Starting at step 202, a power outage is detected at step 204. In the event that a detected disruption in power is a very short and anomalous event, it may be desirable to implement a time delay before taking steps to bring a back-up generator on line. Such a time delay may be on the order of less than a second, to as much as several seconds or more. Such delay is implemented to reduce the number of inadvertent generator startups, and reduce the number of operations of disconnection of the primary. Thus, at block 206, assessment is made whether a time delay is implemented. If an outage is greater than a nominal time delay 208, then steps 210 may be implemented, in which the primary is disconnected 212 (such as via a breaker box or via ATS 108) and the generator is started 214. If a time delay is exceeded 208, then disconnecting the primary 212 and starting the generator 214 may occur after the desired time delay, disconnecting the primary 212 occurs after the generator starts. Once the primary is disconnected 212 and the generator is started 214, then a time delay may further be implemented at step 220 to ensure the generator is fully operational and also to, as examples, assess whether the grid has returned to full power, allow adequate time for generator warm up, and allow stabilization of voltage and frequency outputs. Whether a delay is implemented 226 or not 222 (practically speaking, at least some delay is typically implemented), then loads are switched to the generator at step 224. However, if a delay is implemented 226, then at step 228 a time delay occurs before switching to the generator at step 224. The process ends at step 230.

As such, method 200 includes optional time delays, one or both of which may be implemented to reduce inadvertent activities in the event that the detected power outage is merely a short event that does not warrant switching to generator power. For instance, if an interruption is only a few seconds, it may be beneficial to "wait out" the disruption, as it typically takes a few seconds to several seconds (10-20 seconds) to initiate generator startup, disconnect the primary power source (i.e., utility), and switch over the loads to the generator, all while ensuring to avoid any back-feed of power to the power grid. Whether to use one or both time delays 206, 220 is dependent on system design, criticality of lost power for brief periods of time, and the like.

Figure 3:
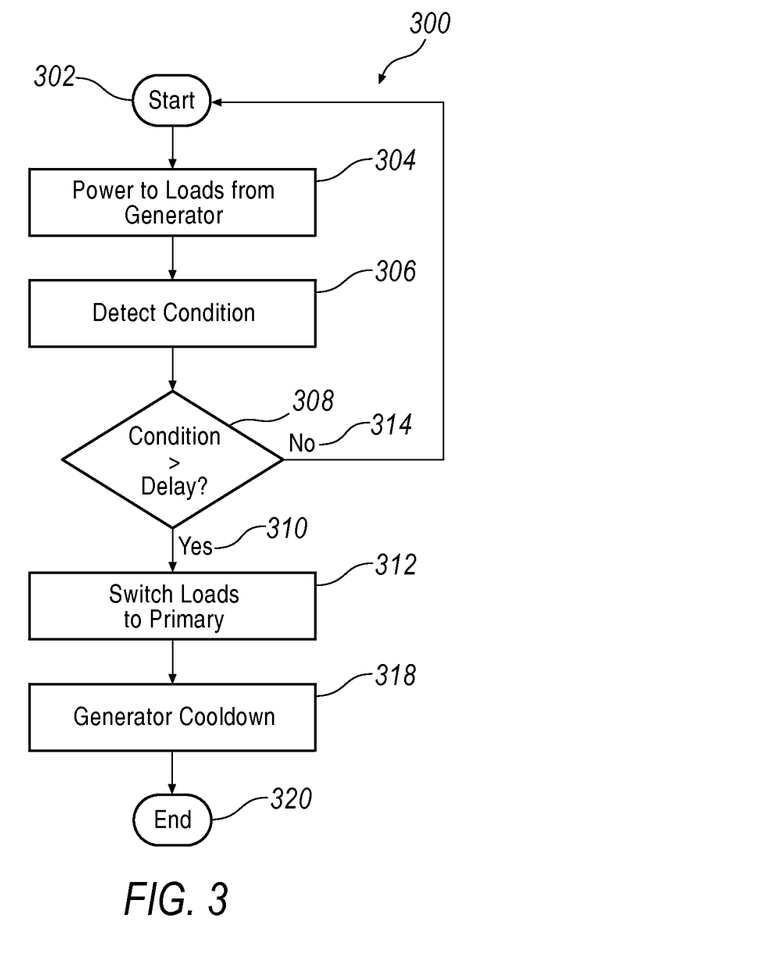
FIG. 3 illustrates a method or process flow that includes steps for bringing the utility or primary power supply back online after generator use.

FIG. 3 illustrates a process flow 300 that includes steps for bringing the utility or primary power supply back online, shutting down the generator, and implementing a generator cool-down. Method 300 starts at step 302, during which time power is being provided to loads from the generator, step 304. When a condition is detected 306, method 300 is triggered to return to primary power and shut down the generator. Typically, the condition detected at step 306 is a voltage from the primary source, which may be detected by switch 108. That is, when power returns from the utility, a voltage is thereby detected and used as an indication that power has returned and the generator is no longer needed. However, the condition indicating power has returned may also be by a manual switch (in which power is known to have returned by an electrician or trained person using detecting equipment such as a volt meter), or by detection of current, or by other means such as a visual indicator that power has returned.

Similarly to generator startup as described with respect to FIG. 2, if, at block 308, the condition 306 is detected 310 for a period that is greater than a nominal delay period, then loads are switched to the primary power supply. That is, if the condition detected at step 306 is but for a brief period of time, and power has not returned in a stable condition, it may be desirable to implement a time delay of a several minutes to perhaps 30 minutes, as an example, to ensure that power from the utility has indeed returned. If the condition exceeds the delay period 310, then loads are switched to the primary or utility supply 312, such as from electrical source 104. Once the loads are switched at step 312, a generator cool-down is implemented at step 318, which typically is a fixed period of time such as 1-2 minutes or up to 5 or more minutes. After generator cool down 318, the process ends at step 320, at which point the generator is shut down and the loads are provided power from the utility.

Figure 4:
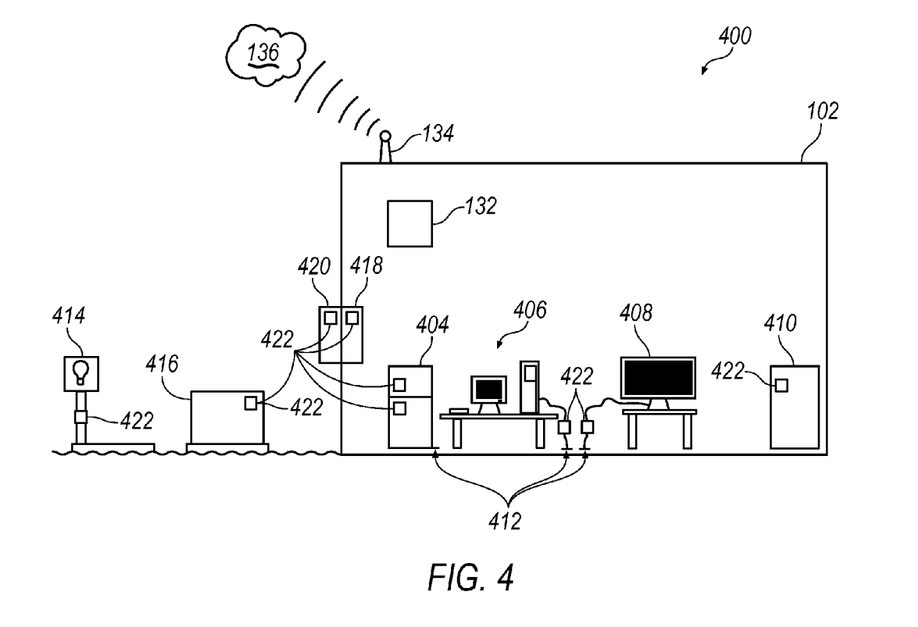
FIG. 4 illustrates a facility such as the facility 100 shown in FIG. 1, but which further includes a plurality of loads and sensors positioned in and proximate to the facility.

Referring to FIG. 4, a facility 400 is illustrated, which corresponds generally to facility 100 shown in FIG. 1, but which further includes a plurality of loads and sensors positioned in and proximate to facility 400. As in FIG. 1, controller 132 is positioned in facility 400 and is coupled to external source 134, which in turn may be coupled to cloud computing 136. Facility 400 includes a number of loads, which correspond generally to loads 1-3, elements 112-116 which, as shown in FIG. 1, are electrically coupled to load center 110, transfer switch 108, controller 132, and external source 134. The loads internal to facility 400 include but are not limited to a refrigerator 402, a freezer 404, a computer 406, a television 408, and a furnace 410 (which may include an electronic control unit for a combustion-based furnace). The loads may be plugged 412 into a socket, to which power is provided for operation thereof, via utility power or via a backup generator, according to various exemplary illustrations. Loads external to facility 400 include, but are not limited to, a lamp that is run at night 414 and an air conditioning unit 416. Temperature sensors may also be included to measure internal temperature 418 and external temperature 420. The various loads described (402-410, 414, 416) and temperature sensors 418, 420, are coupled to controller 132, and their operation may be detected to determine whether facility 400 is occupied. The loads and sensors have devices 422 that are coupled to their respective load or sensor. Devices 422 are configured to detect operation of their respective load or sensor and transmit information related thereto to controller 132. As such, controller 132 is configured to detect operation of loads 402-410, 414, 416 by detecting power consumption, temperatures, and the like, so that controller can determine whether facility 400 is occupied.

For instance, device 422 on air conditioner 416 is configured to transmit power information related to its operation. Whether facility 400 is occupied may be inferred from such information as a load profile or frequency of operation. Occupancy may be determined in conjunction with the output of other devices 422 as well, such as external sensor 420 or internal sensor 418. Occupancy of facility 400 may also be determined based on power consumption of other loads, such as television 408, computer 406, or refrigerator/freezer 402/406. Thus, if television 408 or computer 406 is regularly used, then facility 400 may be assumed to be occupied. Or, if refrigerator/freezer 402/406 is regularly cycling on and off, such may be an indication that the doors thereto are regularly being opened and closed. Conversely, if power to the loads is generally low, then it may be inferred therefrom that facility 400 is occupied. Controller 132 makes the determination based not only on the patterns of use of one or more loads, but also on the time of day. Other systems that the controller may use to assess occupancy may be by automatically accessing the load profile of power to lights, a house temperature setting, a refrigeration load, and a television load, as examples.

In addition, although sensors 422 are illustrated as part of the respective devices on which they are positioned, and sensors 422 are described as providing load information for the purpose of determining occupancy, it is contemplated that other sensors may be used as well to determine occupancy of the building. For instance, an alarm or motion sensor may be implemented as part of an existing structure within the building. The motion sensor may be originally positioned for the purpose of providing security, but in one example the motion sensor may be re-purposed to provide occupancy information tied to the operation of the generator. In another example, instead of providing load information, sensors 422 may themselves provide motion information that can predict or be aware of motion within a room—either by motion of a person within a room, or by temperature detection of objects within a room, as examples. In addition, not only can sensors 422 provide general load information for the purpose of determining occupancy, they may provide additional information regarding a level of occupancy (such as by determining which devices are being used, how frequently, etc.). Such information may be in addition to the determination of loads 1, 2, and 3 above with respect to FIG. 1, or may be in lieu of such information. That is, instead of measuring load at load center 10, load may instead be more directly measured specific to each device throughout the building. And, as discussed, such information may also include proximity information, temperature, and the like, to further augment the system understanding of whether the building is occupied, and to what extent the devices within the building are in use. For instance, conditions may be inferred from alarm system settings, smart thermostats, or smart smoke detectors (which themselves try to determine facility occupancy from computers, tablets or phones, by reporting that someone on the local WiFi network is pressing key presses, cable TV box reporting that someone is manually changing channels, as examples), from home automation system reporting that someone local is switching lights or appliances, or from a microphone picking up certain sounds that indicate people vs. background noises, etc.

Figure 5:
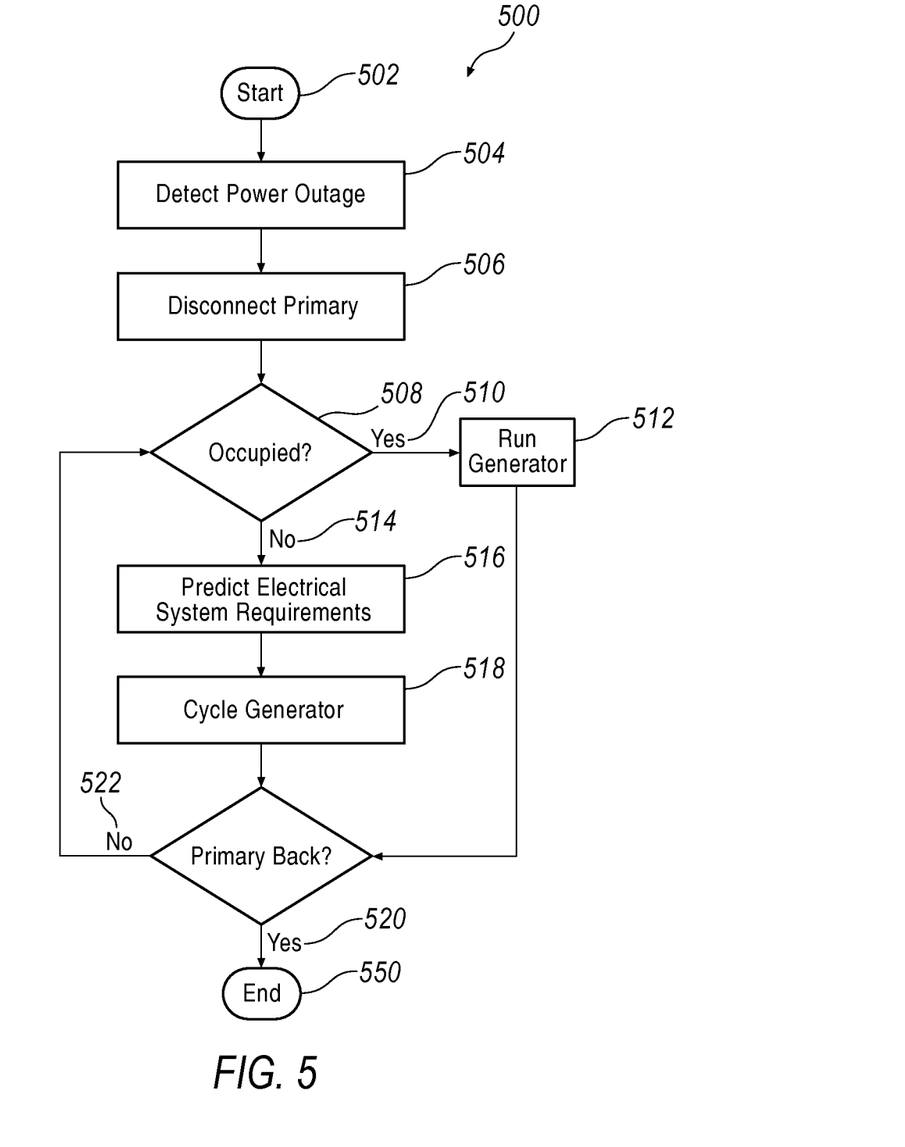
FIG. 5 illustrates a method or process flow for determining when to cycle a generator, according to one example.

Referring to FIG. 5, a method or process 500 is disclosed, according to one example, showing controller assessment of electrical systems for the purposes of determining when to cycle the generator. Starting at step 502, a power outage is detected at step 504 via, for instance, controller 132 or transfer switch 108. At step 506, transfer switch 108 disconnects primary power source 104, as described above. At block 508, controller 132 determines whether facility 400 is occupied by assessing load profiles, power usage, and the like, as described. In one example, a test may be implemented to determine if occupants are active (e.g. awake). That is, the site may be occupied, but occupants asleep. In such an example, the engine start delay could be increased to some longer value (5 or 10 minutes), but still faster than the exemplary 4 hour unoccupied engine start delay, but not so long as to result in house dropping to uncomfortably cold temperatures while sleeping.

If facility 400 is determined to be occupied 510, then in one example controller 132 causes generator 120 to power up at step 512. By powering up at step 512, it is contemplated that such powering of the generator may be at adequate frequency and duration to ensure that equipment is powered as necessary for loads to be used by the occupants, and to ensure proper temperature control, etc. Such does not necessarily mean continuous run at step 512, but rather for the purpose of maintaining adequate power to the loads as necessary. For instance, if power demand is continuous (i.e., several loads running at once), then the generator may be run continuously. But, if only light demand is being placed on the building (even when occupied, but occupants are inactive such as when sleeping), then the generator may be cycled on and off, but at a frequency and duration of runtime to ensure all the demands of such occupancy are being met.

However, if facility 400 is determined not to be occupied 514, then generator 120 may not immediately be powered up and run, but instead facility 400 may be assessed at step 516 to determine a generator restart time based on a prediction of when an electrical system within the facility needs to be cycled.

For instance, referring to FIG. 6, a plot 600 is shown in which an outside temperature 602 is significantly below an inside temperature 604 of an unoccupied facility 400, such as may occur during winter months. Plot 600 shows a general saw-tooth on-off cycle 606 of the internal temperature of facility 400, measured with an internal sensor such as sensor 418. That is, saw-tooth on-off cycle 606 generally occurs during normal operation of a furnace, which turns on and off over time, causing the saw-tooth behavior. At time 608, a power failure occurs and the internal temperature of the facility 400 drops. However, because the facility 400 is unoccupied 514, controller 134 does not cause generator 120 to immediately power up because there may be little need to maintain the internal temperature at a high temperature, other than for perhaps safety purposes related to the risk of pipes freezing, and the like, if the internal temperature becomes too cold. Controller 132 therefore has a pre-programmed lower (and adjustable) temperature setting 610, which allows the internal temperature of the facility to drop below its normal low point (i.e., occupancy temperature low point) in the saw-tooth cycle 606. That is, an electrical system that is the controller of the generator, and not that of the furnace (e.g., a thermostat) controls the house temperature.

Figure 7:
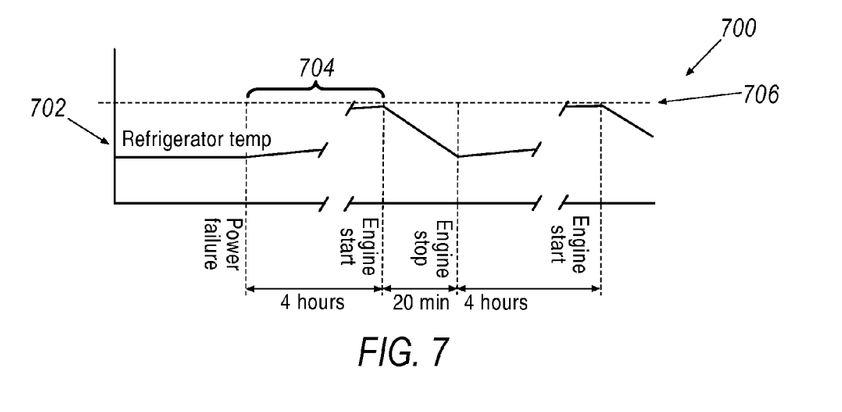

In another example, referring to FIG. 7, a plot 700 shows an internal temperature of a refrigerator, such as refrigerator 402, measured with device 422 therein. The temperature of the refrigerator is normally maintained at a generally low temperature 702. However, upon failure of the power 704, the internal temperature of the refrigerator rises to a pre-set temperature that may be a higher temperature than is allowed during normal operation of refrigerator 402. That is, because facility 400 is unoccupied 514, contents within refrigerator 402 are generally well preserved, even at slightly higher temperature than is normally encountered. But, because the refrigerator door is not being opened and closed, the contents will generally remain fresh for extended periods of time. Thus, it may not be desirable or necessary to constantly cycle the refrigerator (hence the generator), and a delay of perhaps 4 hours 704 will allow the refrigerator temperature to reach a relatively high temperature 706 before the generator is powered up.

Figure 6:
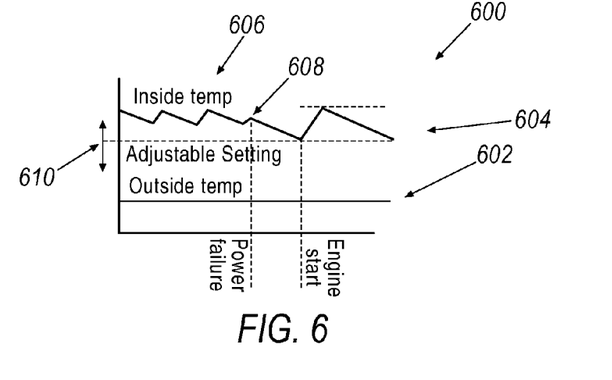
FIGS. 6-8 illustrate exemplary temperature response curves for determining when it may be desirable to power up the generator.

FIGS. 6 and 7 illustrate two electrical systems within the facility 400 that may be used to gage or determine a generator restart time. That is, the cycle of the temperature internal to the facility or internal to the refrigerator are used to predict when an electrical system within the facility needs to be cycled. Further, it is contemplated that FIGS. 6 and 7 illustrate but two examples of any type of electrical system, the cycling of which may be used to determine when to power up the generator for use. Other systems that may be used to determine generator start times may include a temperature sensor on a water pipe, water elevation in a sump pump, and the like. Thus, controller 132 may monitor any number of electrical systems within the facility to determine which of them is the one most in need of cycling, and base the generator restart on that most needy system. For example, if the refrigerator temperature in FIG. 7 has not yet hit its allowable peak temperature 706, but inside facility temperature of FIG. 6 drops to temperature setting 610, then the facility temperature will be the parameter that causes the controller 132 to power up generator 120. Thus, the component most in need of power is detected via a sensor, which may include a sensed exterior temperature, a sensed interior temp, a sensed refrigerator temperature, and a sensed freezer temp temperature, as examples. In one example, the component most in need of power is determined based on an expected response after power has last been used in the components. That is, in one example a temperature sensor may not be available to determine whether to power up the generator. Thus, rather than rely on a temperature sensor, a physics-based cooling profile, such as a temperature of a water pipe and its expected temperature response, may be used to determine when to run the generator. In addition, the amount of runtime of the generator may also be determined based on the time to cool a refrigerator, heat the facility, and the like.

Figure 8:
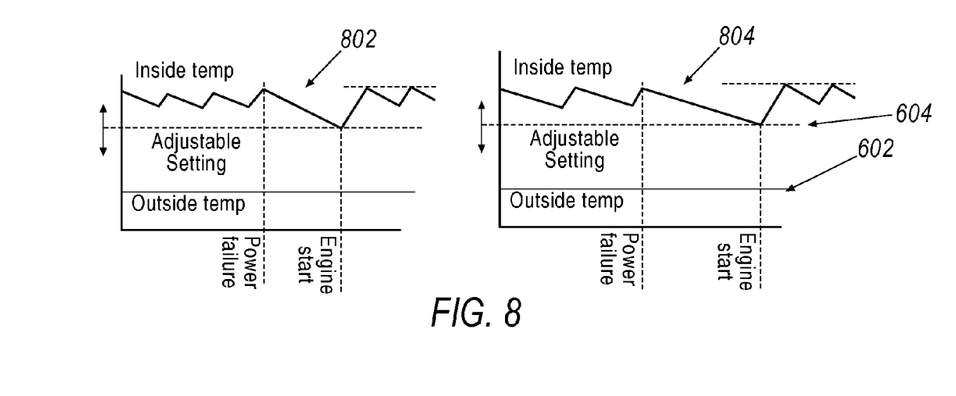

Further, referring to FIG. 8, it is contemplated that temperature set points may be established based on a desired duration of cooling that may be allowed. For instance, cycling may be more rapid in the first scenario 802, compared to that of scenario 804, based on a parameter such as the set point that will be used for controller to power up the generator.

Referring back to FIG. 5, electrical system requirements at step 516 are thereby predicted based on the various set points and guiding electrical systems, such that the system most in need of power will thereby be used by controller 132 to power up the generator. Thus, the generator will be powered for a duration of time to bring the various electrical systems to generally normal operation (that is, internal facility temperature or internal refrigerator may meet there normal temperature range of operation), at which time the generator is cycled 518. That is, process 500 continues and the generator 120 is cycled until primary power is returned 520 and the process 500 ends 550. However, if primary power is not back 522, then control returns to block 508 to assess again whether the facility 400 is occupied. Thus, process 500 continues to monitor and cycle the generator if the building remains unoccupied and based on the equipment deemed to be most needy, based on temperature cycles and the like.

According to one example, controller 132 determines whether facility 400 is occupied at step 508 using a user notification to the controller. That is, controller 132 may have a manual or wireless input through which an occupant or owner informs controller 132 that the facility is unoccupied. As such, rather than rely on assessment of load profiles, controller 132 may instead be directly informed of the occupancy status. Such notification may be from a user to the controller via one of a hand held device and a computer browser. Or, such notification may be via a manual switch, such as on controller 132 or transfer switch 108, as examples.

In general, computing systems and/or devices, such as the processor and the user input device, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above, or a NoSQL database such as MogoDB or Cassandra, as examples.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for providing backup power to a facility, comprising:
 a generator; and
 a controller configured to:
  determine whether electrical power to the facility has been interrupted; and
  automatically determine a generator restart time delay based at least on a prediction of when an electrical system within the facility needs to be cycled.

2. The system of claim 1, wherein the controller is further configured to:
 determine whether the facility is occupied; and
 automatically determine a generator restart time delay based also on whether the facility is determined to be occupied.

3. The system of claim 2, wherein the controller is configured to determine whether the facility is occupied by assessing a load profile of loads within the facility, and wherein the controller is configured to assess the load profile by automatically assessing the load profile of at least one of power to lights, a house temperature setting, a refrigeration load, and a television load.

4. The system of claim 1, wherein the controller is configured to predict when the electrical system needs to be cycled based on a measured internal temperature within the facility.

5. The system of claim 4, wherein a temperature at which the electrical system is cycled is a temperature of one of an internal facility temperature and a refrigerator temperature that is below a temperature that is maintained when the facility is occupied.

6. The system of claim 1, wherein the prediction is based on a component that is determined by the controller to be the component most in need of power based on when the electrical system needs to be cycled.

7. The system of claim 6, wherein the component most in need of power is detected via a sensor, that includes one of a sensed exterior temperature, a sensed interior temp, a sensed refrigerator temperature, and a sensed freezer temp temperature, and wherein the component most in need of power is determined based on an expected response after power has last been used in the components.

8. The system of claim 1, wherein the controller is further configured to automatically determine the generator restart time delay based on a temperature within the facility that is below a low temperature that occurs during cycling of the electrical system and when power has not been interrupted.

9. The system of claim 1, wherein the controller is further configured to:
 determine whether a power outage has occurred from an electrical grid when determining whether the electrical power to the facility has been interrupted; and
 if the electrical power to the facility has been interrupted, provide power to the facility after automatically determining the generator restart delay.

10. A method for providing backup power to a facility, comprising:
 determining whether electrical power to the facility has been interrupted; and
 automatically determining a generator restart time delay based at least on a prediction of when an electrical system within the facility needs to be cycled.

11. The method of claim 10, further comprising determining an occupancy of the facility, and automatically determining the generator restart time delay based also on the occupancy.

12. The method of claim 11, further comprising:
 determining whether the facility is occupied using a user notification to the controller, wherein the user notification is via one of a hand held device and a computer browser; or
 determining whether the facility is occupied by assessing a load profile of loads within the facility, and by automatically accessing the load profile of at least one of power to lights, a house temperature setting, a refrigeration load, and a television load.

13. The method of claim 10, further comprising predicting when the electrical system needs to be cycled based a measured internal temperature within the facility, wherein a temperature at which the electrical system is cycled is a temperature of one of an internal facility temperature and a refrigerator temperature that is below a temperature that is maintained when the facility is occupied.

14. The method of claim 10, wherein the prediction is based on a component that is determined by the controller to be the component most in need of power based on when the electrical system needs to be cycled.

15. The method of claim 14, further comprising detecting the component most in need of power based on an expected response after power has last been used in the components.

16. The method of claim 10, the method further comprising:
 determining whether a power outage has occurred from an electrical grid and that electrical power to the facility has been interrupted; and
 if the power to the facility has been interrupted, automatically determining the generator restart time delay to provide power to the facility.

17. A non-transitory computer-readable medium tangibly embodying computer-executable instructions to:
 determine whether electrical power to a facility has been interrupted; and
 automatically determine a generator restart time delay based at least on a prediction of when an electrical system within the facility needs to be cycled.

18. The computer-readable medium as claimed in claim 17, wherein the instructions further comprise a step to determine whether the facility is occupied by assessing a load profile of loads within the facility, by automatically accessing the load profile of at least one of power to lights, a house temperature setting, a refrigeration load, and a television load.

19. The computer-readable medium as claimed in claim 17, wherein the instructions further comprise a step to predict when the facility needs to be cycled based on a component that is determined by the controller to be the component most in need of power based on when the electrical system needs to be cycled, wherein:
 the component most in need of power is detected via a sensor, that includes one of a sensed exterior temperature, a sensed interior temp, a sensed refrigerator temperature, and a sensed freezer temp temperature; or
 the component most in need of power is determined based on an expected response after power has last been used in the components.

20. The computer-readable medium as claimed in claim 17, wherein the instructions further comprise steps to:

determine whether a power outage has occurred from an electrical grid and the electrical power to the facility has been interrupted; and if the power has been interrupted, automatically determine the generator restart time delay to provide power to the facility.

* * * * *